United States Patent [19]

Wilcken

[11] Patent Number: 5,457,533
[45] Date of Patent: Oct. 10, 1995

[54] POINT-DIFFRACTION INTERFEROMETER UTILIZING SEPARATE REFERENCE AND SIGNAL BEAM PATHS

[76] Inventor: Stephen K. Wilcken, 1081 Angler La., Grants Pass, Oreg. 97527-6274

[21] Appl. No.: 258,196

[22] Filed: Jun. 10, 1994

[51] Int. Cl.⁶ .................................................... G01B 9/02
[52] U.S. Cl. ........................... 356/354; 356/345; 356/359
[58] Field of Search ..................................... 356/351, 354, 356/345, 359, 360

[56] References Cited

U.S. PATENT DOCUMENTS 4,744,658  5/1988  Holly ........................................ 356/351
5,239,364  8/1993  Matsuzaki ................................ 356/345

FOREIGN PATENT DOCUMENTS 0452283  10/1991  European Pat. Off. .

OTHER PUBLICATIONS

R. N. Smartt and J. Strong: *J. Opt. Soc. Amer.* vol. 62 (1973) p. 737.
R. N. Smartt and W. H. Steel: *Japanese Journal of Applied Physics*, vol. 14 (1975) Suppl. 14-1, pp. 351-356.
C. Koliopoulos et al.: *Optics Letters*, vol. 3, Sep. 1978, pp. 118-120.
R. N. Smartt: *Interferometry*, G. W. Hopkins ed., Proc. SPIE, vol. 192 (1979), pp. 35-40.

Primary Examiner—Samuel A. Turner
Assistant Examiner—Robert Kim
Attorney, Agent, or Firm—Dean P. Edmundson

[57] ABSTRACT

A split-path point-diffraction interferometer (SPPDI) comprising separate signal and reference beam paths is disclosed. A beamsplitter is used to divide a linearly polarized converging incident signal beam into separate signal and reference beam paths prior to focus. The reference beam path comprises a diffracting aperture located at the focal point of the signal beam. The diffracting aperture in the reference beam path produces an expanding, diffraction-limited reference wavefront. The signal and reference beam paths comprise linear polarizers whose yaw, pitch, and roll orientation may be freely adjusted. Yaw and pitch adjustment of one or more linear polarizers provides for adjustment of fringe spacing and orientation. Roll adjustment of one or more linear polarizers provides for adjustment of fringe contrast and intensity. Beam turning mirrors are used to direct the signal and reference beams to a beam combiner. Polarizing analysers are placed in the combined output beams produced by the beam combiner. A double-pass embodiment of an SPPDI comprising a beam splitter and compact laser source is disclosed.

20 Claims, 2 Drawing Sheets

POINT-DIFFRACTION INTERFEROMETER UTILIZING SEPARATE REFERENCE AND SIGNAL BEAM PATHS

BACKGROUND OF THE INVENTION

1. Field of the Invention

This invention relates to an optical interferometer of the point-diffractive type, and more particularly, to a point-diffraction interferometer incorporating separate signal and reference beam paths.

2. Prior Art

The point-diffraction interferometer (PDI) was first described by Raymond N. Smartt and J. Strong in the *Journal of the Optical Society of America*, vol. 62, 1972, page 737. The theoretical basis for operation of the PDI is discussed in several articles, notably by Raymond N. Smartt et al. in the *Japanese Journal of Applied Physics*, Vol. 14, Suppl. 14-1, pp. 351–356, 1975; and by C. Koliopoulos et al. in Optics Letters, Vol. 3, pp. 118–120, September 1978. The usefulness of the PDI for testing large optical systems in-situ is discussed in a paper by Raymond N. Smartt in *Interferometry*, G. W. Hopkins ed., Proceedings of the SPIE, vol. 192, p. 35, 1979. A PDI of the prior art is presently marketed by Ealing Beck Ltd. of Watford, England, and is available in the U.S. through the Ealing Corporation, of South Natick, Mass.

Figure 1:
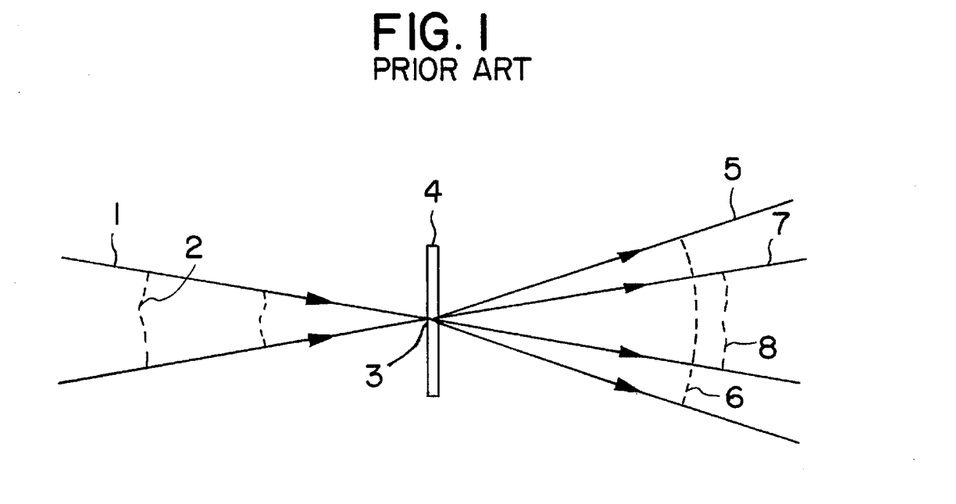
FIG. 1 is a schematic representation of a point diffraction interferometer of the prior art.

FIG. 1 is a schematic representation of the prior art PDI. As seen in FIG. 1, the PDI is an elegant and simple interferometer well suited for embodiment in a small, rugged package. FIG. 1 shows that the PDI is placed in a converging beam 1 of light produced by the optical system which is to be tested. It is not necessary that the incident beam be temporally coherent light from a laser source, since the PDI is a common path interferometer. However, a laser source is ideal for use with a PDI.

The aberrated signal beam 2 is brought to a focus near a small (typically 5 microns diameter) pinhole aperture 3 located in a semi-transparent optical thin film deposited on substrate 4. Some of the optical energy contained in the incident beam passes through, and is diffracted by, pinhole aperture 3. Pinhole aperture 3 creates an expanding, diffraction-limited reference beam 5, consisting of spherical expanding waves 6. The remainder of the incident beam passes unchanged, but with reduced itensity, through coated substrate 4 to form diverging beam 7, which retains the aberrational content 8 of the original signal beam 2. Interference between the diffracted reference wavefront 6 and the signal wavefront 8 yields interference fringes.

Interference fringes produced by the PDI are interpreted in the same manner as interference fringes produced by a Twyman-Green interferometer. Aberration of the signal beam is directly indicated by the shape of the interference fringe contours. Focus error is indicated by fringes which have a circular contour. This arises if the signal beam converges to focus either ahead of, or beyond, the PDI pinhole. If focus error is removed, the remaining wavefront errors associated with the signal beam will be revealed in the form of fringes which deviate from straight lines. The nature of the deviation from straight lines will indicate the presence of optical aberrations (spherical, coma, astigmatism, etc.,) and/or manufacturing defects in the optics being tested.

In the PDI, fringe spacing is governed by the distance between the pinhole aperture and the centroid of focused energy in the point spread function of the incident beam. Fringe orientation is governed by the relative orientation of the focal position of the incident beam with respect to the pinhole aperture. If the separation between the focal point of the incident beam and the pinhole aperture is large, closely spaced fringes will result; if the separation is small, the fringes will be widely separated. It is easy to adjust fringe spacing with the PDI by a lateral translation of either the PDI pinhole aperture or the focal position of the incident beam. However, fringe visibility will vary because the amplitude of the signal base point spread function is not constant with radius.

If a converging signal beam is diffraction-limited, or nearly so, the point spread function will consist of an Airy disc surrounded by faint rings. In this case, little optical energy will be available for creation of a reference wavefront, except with the Airy disc. It will thus be necessary to position the PDI pinhole aperture within the Airy disc in order to generate a reference wavefront which has sufficient amplitude to produce fringes with acceptable visibility. However, the resulting fringes will be widely spaced. For a typical diffraction-limited signal beam, only 2 or 3 straight fringes of acceptable contrast may be generated. Any attempt to increase the number of fringes by increasing the separation between the focal spot and the pinhole will result in a loss of fringe contrast. This effect is independent of the focal ratio of the signal beam or the physical size of the Airy disc.

In the PDI, balance between the intensity of the signal and reference beams is achieved by optically attenuating the intensity of the signal beam. There will only be one radial distance from the center of the point spread function where the intensity of the reference beam produced by the PDI pinhole aperture will be ideal for best fringe contrast. This radial distance, in turn, will govern the number of fringes which are observed.

In summary, fringe contrast and fringe spacing are not independently variable in the prior art PDI. It is not possible to generate high contrast, closely spaced fringes for incident signal beams with low wavefront errors. This situation presents a problem for automated fringe analysis computer programs, which typically require 8 or more fringes in order to generate a meaningful contour map of the optical surface or wavefront under investigation. It is therefore an object of this invention to enhance the operational characteristics of the prior art PDI so as to provide for independent adjustment of fringe spacing, orientation, contrast, and intensity regardless of the quality of the signal beam.

Figure 2:
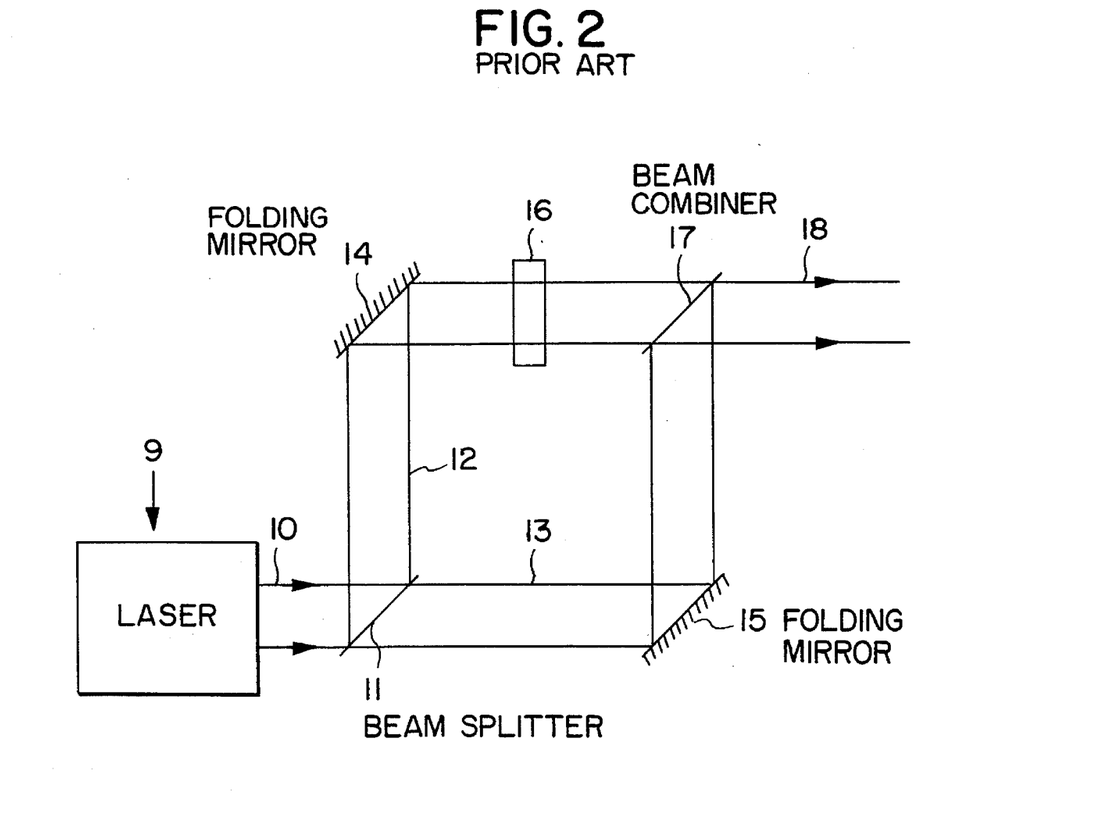
FIG. 2 shows a Mach-Zehnder interferometer of the prior art.

Independent adjustment of fringe spacing, orientation, contrast, and intensity may be facilitated by splitting the incident signal beam into separate signal and reference beams, as in a Mach-Zehnder interferometer. FIG. 2 is a schematic illustration of a Mach-Zehnder interferometer of the prior art. In FIG. 2, a high quality collimated incident beam 10 produced by laser 9 is split into signal beam 12 and reference beam 13 by beamsplitter 11. The two beams are directed toward beam combiner 17 by folding mirrors 14 and 15. An optical component of unknown quality 16 is spaced in a signal beam 12 just prior to beam combiner 17, thereby modifying the wavefront of signal beam 12. Interference between the modified signal beam and the reference beam is observed in combined beam 18. A laser source must be used in a Mach-Zehnder interferometer, due to the difference in optical path lengths along the signal and reference beam paths caused by the presence of the test component.

The existence of separate signal and reference beam paths is a major advantage. Each beam in a Mach-Zehnder interferometer may be independently adjusted for intensity and direction, thereby permitting adjustment of fringe spacing, orientation, contrast, and intensity. An object of this invention is therefore to incorporate separate signal and reference beam paths into a PDI, thereby providing for fringe adjustability in a manner similar to a Mach-Zehnder interferometer.

The reference beam in a Mach-Zehnder interferometer is generated externally by large, expensive, diffraction-limited collimation optics. By contrast, in a PDI an inexpensive pinhole aperture serves to create a reference beam by spatially filtering the incoming signal beam. The advantages gained in a PDI through reductions in size, complexity, and cost are retained in the split-path PDI.

The signal beam in a Mach-Zehnder interferometer is generated internally when the reference beam encounters the unknown optical component. For a PDI, the signal beam is generated externally. Constraints on the physical size of the optical component or system being tested vanish when these can be located externally. Thus, an important advantage is gained for a PDI by eliminating the need to place the test component within the signal arm of the interferometer. This advantage is retained for the split-path PDI. The only requirement is that the component or system being tested produce a converging beam. Since many optical systems ranging from small lenses to large telescopes are designed to produce converging beams, this is not much of a restriction. When this is not the case, conversion optics of suitable quality may often be used.

In summary, it is the object of this invention to incorporate split beam paths into an interferometer of the point-diffractive type, thereby providing the flexibility to vary fringe spacing, orientation, contrast, and intensity. The split beam paths are highly advantageous and are not known in the prior art PDI. It is the further object of this invention to retain the best features of the prior art PDI, such as: (1) a low cost pinhole aperture for generating a reference wavefront; (2) the ability to perform non-invasive or in-situ testing of many kinds of optical components and systems; and (3) small physical size consistent with providing for a compact, rugged design suitable for rough handling on a daily basis. In keeping with the intention of providing a compact, rugged design, and to provide greater flexibility to the user, it is a further object of this invention to incorporate a compact, solid state laser diode light source and a double-pass beamsplitter such that double-pass interferometry may be performed, while keeping the overall package size small.

SUMMARY OF THE INVENTION

A split-path PDI overcomes the limitations of the prior art PDI by dividing a converging incident signal beam into two parts. This is done by an optical beamsplitter. One portion of the signal beam is brought to focus on a small pinhole aperture in a nearly opaque substrate. The pinhole aperture spatially filters the signal beam thereby creating a diffraction-limited reference beam. The reference beam and the remaining portion of the signal beam are directed toward a beam combiner by turning mirrors located in each beam path. If the turning mirrors are adjusted properly, and if the optical power in the signal and reference beams are balanced properly, high contrast interference fringes will be observed in the output beams produced by the beam combiner.

The fringe spacing and orientation observed in the recombined signal and reference beams depends on the apparent separation of the beam divergent points. This apparent separation may be controlled by the beam turning mirrors. However, this is a very sensitive adjustment. In the preferred embodiment of a split-path PDI, the beam turning mirrors are only used to bring the apparent beam divergent points into coincidence, and are then locked down. Subsequent changes to fringe spacing and/or orientation are accomplished by the use of thin, transparent optical windows located in each beam path. As these windows are tilted, the apparent positions of the divergent points of the signal and reference beams appear to shift. This technique has the added advantage of translating the beams without changing the beam orientation.

The tilt plate windows are comprised of optical glass-laminated linear polarizing filter material. As the tilt plate windows are rotated in the presence of polarized signal and reference beams, the relative amplitudes of each beam may be adjusted. Linear polarizing analyzers are placed in the output beams produced by the beam combiner so that the signal and reference beam electric field vectors are resolved into parallel components.

The preceding description of a split-path PDI has been very general. A preferred embodiment for a split-path PDI will be presented below, along with justification for the choice of particular components and their placement along the signal and reference beam paths.

DETAILED DESCRIPTION

This section summarizes the operational characteristics and components which comprise the preferred embodiment of a split-path PDI constructed according to the principles of this invention. It is to be understood that the invention covers either a single-pass or double-pass implementation of the split-path PDI, with the double-pass version being the preferred embodiment. Hereinafter, the designation SPPDI will refer to either a single-pass or double-pass implementation of the invention. The SPPDI is comprised of various optical and mechanical components, each of which separately, or in combination, are declared as claims of this patent. These optical and mechanical components provide the needed ability to independently adjust fringe spacing, orientation, contrast, and intensity.

Figure 3:
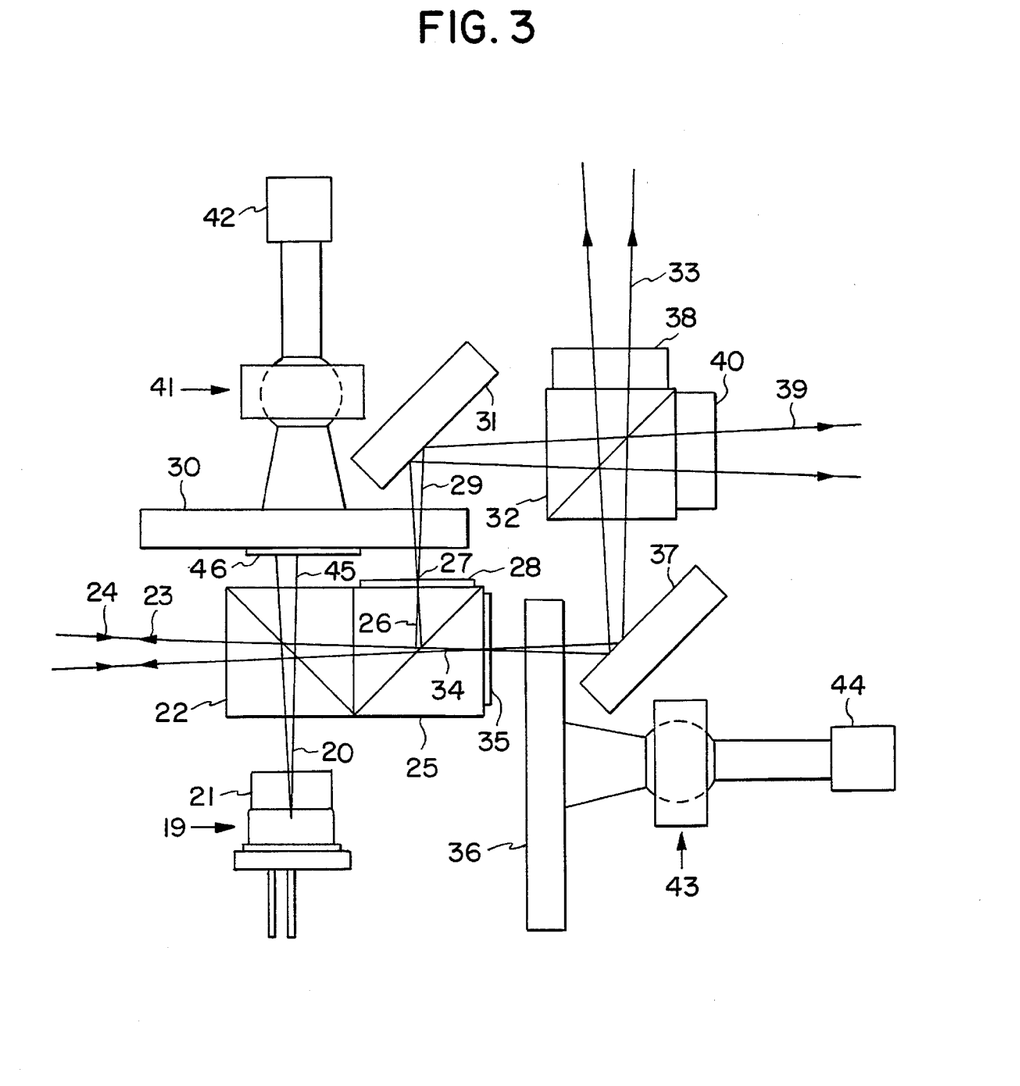
FIG. 3 shows the preferred embodiment of a split-path point diffraction interferometer.

The preferred embodiment of a double-pass SPPDI constructed according to the principles of this invention is illustrated in FIG. 3. In FIG. 3 laser diode 19 produces a visible output beam 20, which passes through linear polarizing filter 21. Linear polarizing filter 21 is adjusted for maximum transmission of laser beam 20.

Laser beam 20 enters non-polarizing cube beamsplitter 22, where between 40% and 45% of the beam is reflected by the beamsplitter coating as output beam 23, and the remainder is either absorbed in the beamsplitter coating or is directed into transmitted output beam 45, which is absorbed by black absorber 46 located near the center of polarizing tilt plate 30.

Polarized output beam 23 is directed out of the SPPDI, where it encounters the optical component or system to be tested. An f/10 to f/15 portion of output beam 23 is returned as incident signal beam 24 by retroreflection from the external optical system. Incident signal beam 24 re-enters beamsplitter 22, where a portion is reflected back toward laser diode 19 along beam path 20 and is lost.

The remaining portion of incident signal beam 24 is transmitted through beamsplitter 22 and enters non-polarizing cube beamsplitter 25. Reflected portion 26 of incident signal beam 24 exist beamsplitter 25 and the location of pinhole aperture 27 located near the center of nearly opaque substrate 28. Pinhole aperture 27 spatially filters beam 26, thereby generating reference beam 29. Reference beam 29 passes through polarizing tilt plate 30, and then hits beam turning mirror 31, which directs reference beam 29 into non-polarizing cube beam combiner 32.

The transmitted portion of incident signal beam 24 passes without further modification as signal beam 34 through non-polarizing cube beamsplitter 25. After leaving beamsplitter 25, signal beam 34 passes through optical path compensator plate 35, through polarizing tilt plate 36, and then hits beam turning mirror 37, which directs signal beam 34 into non-polarizing cube beam combiner 32.

Beam combiner 32 combines reference beam 29 with signal beam 34, thereby creating recombined beams 33 and 39. After exiting beam combiner 32, beams 33 and 39 pass through linear polarizing analysers 38 and 40. Polarizing analysers 38 and 40 are bonded with optical cement to the output faces of beam combiner 32. Interference fringes may be observed in either of the two output beams 33 and 39.

Rod end spherical bearings 41 and 43 are used to facilitate adjustment of roll, pitch, and yaw of the polarizing tilt plates 30 and 36. Adjustment of the rod end spherical bearings is accomplished with knobs 42 and 44. When the roll, pitch, and yaw of polarizing tilt plates 30 and 36 have been adjusted for best fringe intensity, contrast, spacing, and orientation, interference fringes in either or both of exit beams 33 and 39 may be detected visually, or recorded photographically or by an electronic imaging device.

The nature and purpose of the various components in the preferred embodiment of an SPPDI will now be described in more detail. Other components or devices which may serve secondary roles in a working embodiment of this interferometer, such as internal or external light baffles for reducing stray light, optics for converting the focal ratio of output beam 23 to other specific focal ratios suited for probing external optical systems, and devices for adapting exit beams 33 and 39 to various optical systems or image forming devices, will not be described in detail, since they are not specific to the invention.

The individual components will be described in the order in which they are encountered by the laser beam. Since the preferred embodiment operates in a double-pass mode, the discussion will begin with the built-in laser source.

The split-path PDI is not a common path interferometer. However, the symmetry of the optical design used in the preferred embodiment aids in achieving optical path lengths that are very nearly equal. For example, optical compensating plate 35 is introduced into the signal beam to compensate for the thickness of glass substrate 28 associated with pinhole aperture 27. Optical compensating plate 35 is made from optical glass and is about 0.020" thick, which is the same thickness as pinhole aperture substrate 28. Even with these efforts to keep the path lengths equal, residual optical path length difference in the signal and reference beam paths due to small assembly errors and/or manufacturing defects in the optics are unavoidable. These residual path length differences result in the need for a small level of temporal coherence in the incident signal beam. The required level of temporal coherence for production of interference fringes is easily met by virtually any laser source, including laser diodes.

In the prototype embodiment of the double-pass SPPDI, laser source 19 is comprised of a 5 milliwatt visible laser diode (Toshiba model TOLD9211) operating at a wavelength of 670 nanometers. The choice of a laser diode is consistent with one of the major objectives of this invention of providing for a self-contained, compact, rugged embodiment of the SPPDI. The entire SPPDI shown in FIG. 3, including the laser diode and driving electronics, fits inside a cube 2 inches on a side.

The laser is operated at a power level of 3 milliwatts, in order to increase life expectancy. The laser emitting aperture has physical dimensions of about 1 micron by 5 microns, and has astigmatism of about 20 microns. The laser diode is contained in a hermetically sealed package with a 0.25 mm thick fused silica window.

In the double-pass optical arrangement, the emitting aperture of the laser diode is re-imaged back into the SPPDI by the external optical system which is being tested. Since the laser is not actually a point source and has a small amount of astigmatism, it is important that the laser emitting aperture, along with the astigmatism, be unresolved by the optical system being tested. This is assured by using no more than the central f10 portion of the laser output beam. As discussed below, spherical aberration associated with transmitting a non-collimated beam through cube beamsplitters is also reduced by keeping the f/number high.

The Airy disc diameter for an f/10 beam at 670 nanometers if about 16 microns. The light from the laser will thus appear to diverge from a region about 16 microns in diameter, which leaves the 1 micron by 5 micron emitting aperture of the laser unresolved. For laser diodes, astigmatism relates to the apparent position of the beam divergent point, which varies with respect to off-axis beam angle. However, if only the central f10 portion of the beam is used, the astigmatism will be unresolved. The spherical aberration introduced by the fused silica window in the laser package is also negligible for an f/10 beam. The disadvantage of this approach is that most of the output beam of the laser is unused, leaving only a small fraction (about 10%) of the available beam power for use in interferometry. Our experience has shown that this amount of power is acceptable.

Polarizing filter 21, placed between laser diode 19 and beamsplitter 22, causes output beam 20 to appear to diverge from a more nearly diffraction-limited point source, by reducing the intensity of unpolarized light from spontaneous emission, and by reducing the intensity of light from laser modes in other states of polarization.

After careful analysis, beamsplitter cubes were chosen for use in the preferred embodiment of an SPPDI. Residual optical effects must be considered, including astigmatism, spherical aberration, beam translation, ghost reflections, etc. Beamsplitter cubes are less afflicted with ghost reflections than some other types of beamsplitters, and do not introduce astigmatism or beam translation. However, beamsplitter cubes must be used in nearly collimated light in order to keep spherical aberration to a minimum. Diffraction beam splitters, such as those used in the optical read heads of low-cost compact disk players, appear to offer an attractive second choice.

The amount of spherical aberration introduced by a beamsplitter cube depends on both the thickness of glass and the beam f/number. Three 10 mm beamsplitter cubes are used in the preferred embodiment of an SPPDI, along with several polarizing filters, for a total double-pass glass thickness of 41 mm along the signal beam path. This amount of glass introduces about 0.0016 waves (RMS) spherical aberration in a f/10 beam at a wavelength of 670 nanometers, which is considered negligible in comparison to the wavefront errors introduced by residual manufacturing defects in the SPPDI optical components. To reduce the effect of residual manufacturing defects, the size and spacing of the optical components are kept small, thereby keeping the beam size small where it intersects each surface.

There are no internal apertures within the SPPDI to limit the focal ratio of output beam 23 to f/10. Such apertures would introduce unwanted edge diffraction effects. Therefore, it is necessary to introduce conversion optics in output beam 23 to make the external optical component or system appear to have a focal ratio of between f/8 and f/16. Beyond f/16, excessive amounts of astigmatism are introduced as polarizing tilt plates 30 and 36 are tilted more and more in an attempt to keep the interference fringe count at an acceptably high level. Under f/8, excessive amounts of spherical aberration are introduced by the cube beamsplitters.

We will now discuss the design considerations for pinhole aperture 27 located on coated substrate 28. It should be noted that pinhole aperture 27 and the emitting aperture of laser diode 19 are located at each other's virtual image position with respect to the reflective hypotenuse of beamsplitter 22. The position of the laser is specifically chosen to coincide with the virtual image of pinhole aperture 27, and vice versa.

The pinhole aperture is placed in the reflective direction for beamsplitter 25, so that any irregularities in the figure of the reflective hypotenuse of the cube beamsplitter will not be introduced into the signal beam, and will be removed from the reference beam by pinhole aperture 27.

Pinhole aperture 27 is arguably the most critical component within the SPPDI. In particular, the diameter of the pinhole aperture must be large enough to produce a reference beam with a suitable amount of power, and must be small enough to produce a diffracted wavefront with large angular divergence so that relatively uniform illumination is produced across the central f/10 portion of the signal beam. Theory suggests, and practice confirms, that the diameter of the pinhole aperture should be about ⅓ of the diameter of the Airy disc which pertains to the focal ratio and wavelength of the incident signal beam. For an f/10 signal beam with a wavelength of 670 nanometers, the required pinhole aperture diameter is therefore about 5 or 6 microns.

In the preferred embodiment of an SPPDI, pinhole aperture 27 is constructed photographically, using the same materials and processes developed for fabricating integrated circuit masks. A 5 micron diameter transparent pinhole is formed at the center of a pattern of narrow, broken lines arranged in the form of a square. The pinhole aperture and broken square pattern are transparent regions in an otherwise nearly opaque thin layer of chrome deposited on a 0.020" thick optical glass substrate.

The thickness of the chrome layer is adjusted to yield an optical density between 5 and 6. This optical density, in combination with the incident power in the reference beam, provides sufficient light leakage to allow the focal point of the incident signal beam to be seen through the chrome coating. With an optical density of 5, the chrome coating is finely balanced between the transparence required for ease of positioning the incident light beam on the pinhole aperture, against the opacity required to prevent excessive interference between the residual light transmitted by the coating and the diffracted wavefront produced by the pinhole aperture. As a further aid in positioning the focused beam on the pinhole aperture, random scattered light within the SPPDI serves to illuminate the perimeter of the broken square, thus providing a visual reference to the central position of the pinhole aperture.

The fabrication of the master pinhole aperture and fiducial square pattern involves the use of sophisticated photographic equipment capable of achieving resolution on the order of 1 micron or less. This is a relatively expensive process. However, after the master pinhole aperture pattern has been fabricated, a large number of replicas may be produced by an inexpensive contact printing process.

Photographically produced pinhole apertures offer several benefits over the traditional laser drilled pinhole apertures commonly used for spatially filtering laser beams. First, in larger quantities, photographic pinhole apertures can be substantially less expensive than laser drilled apertures. Second, since the patterned side of the glass substrate may be optically bonded directly to the exit face of the cube beamsplitter, a total immunity to dust may be achieved. Laser drilled apertures of this diameter are very difficult to keep clean. Third, the ability to position the incident light beam on the pinhole aperture is greatly enhanced by the surrounding square fiducial pattern. The typical laser drilled aperture is centered in an opaque disk of stainless steel, which would make alignment of the beam on the pinhole aperture very difficult. Although the unfiltered signal beam might be used as an alignment reference, an excessive amount of alignment "hunting" would still be required due to unavoidable residual misalignment or parallax between the signal and reference beams.

There are reasons for keeping the interferometer path lengths relatively equal, beyond the benefit of relaxing the need for temporal coherence in the incident signal beam. If the path lengths were not equal, the signal and reference beams would appear to diverge from point sources located at different distances, resulting in curved fringes due to an apparent focus error. Although one might argue that simply adjusting the focus of the external optical system would remove the apparent focus error, this would also result in reducing the intensity of light incident on pinhole aperture 27. In order to produce the brightest possible reference beam, the converging signal beam should be brought to focus as nearly as possible on pinhole aperture 27. With the presence of a compensating plate and a properly aligned interferometer, residual path length differences and apparent focus error will be small enough to be within the acceptable range for compensation by focusing the external optical system.

As indicated earlier, polarizing tilt plates 30 and 36 are used for adjusting the position of the apparent divergent points for reference beam 29 and for signal beam 34. If the diverging points are initially superimposed, a tilt of 1.89 degrees in one 3.0 mm thick tilt plate will cause an apparent separation of 34 microns in the apparent positions of the divergent points, and will cause 5 fringes to appear within the combined f/10 output beams. However, a tilted plate of flat glass in a converging or diverging beam will introduce astigmatism into the beam. The amount of astigmatism depends on the amount of tilt and the thickness of the glass plate.

The total amount of RMS wavefront error introduced into an f/10 beam which traverses 41 millimeters of optical glass, including a 3 millimeter portion tilted at 1.89 degrees, is only 0.0018 waves RMS at 0.67 microns. As indicated earlier, 0.0016 waves RMS wavefront error are introduced into the beam by spherical aberration. Only an additional 0.0002 waves come from astigmatism from the tilted plate.

A theoretical study was performed to determine the effect on RMS wavefront error for different beam focal ratios, with one tilt plate always tilted sufficiently to impose 5 fringes across the angular width of the beam. The condition of a constant number of fringes requires more and more tilt as the focal ratio increases. The theoretical model used in the study comprised 38 millimeters of BK7 optical glass at normal incidence, plus an additional 3 millimeter portion at increasing levels of tilt. The results of the theoretical study for focal ratios from f/5 to f/25 show that spherical aberration decreases faster than the increase in astigmatism caused by increasing amounts of tilt, with the overall effect being a constant decrease in RMS wavefront error. At some point beyond f/25, the overall RMS wavefront error will begin to increase due to increasing amounts of astigmatism. Again, it appears that a focal ratio of f/10 provides sufficient utilization of laser energy while keeping geometrical aberrations at an acceptable level. With the intent to keep aberrations at a minimum, two tilt plates are provided for in the SPPDI preferred embodiment. If these two tilt plates are tilted by 1.89 degrees in opposite directions, a total of 10 fringes may be generated in the f/10 output beam without increasing astigmatism.

The other purpose for the polarizing tilt plates is for adjusting the intensity in the beams. However, after rotating the polarizing tilt plates in order to adjust beam intensity, the electric field vectors in the signal and reference beams will be left at some random orientation. After recombination in beam combiner 32, if the electric field vectors happen to be perpendicular, interference will not occur. Maximum contrast is achieved if the electric field vectors are parallel. Therefore, polarizing analysers 38 and 40 are placed at the two exit faces of beam combiner 32 in order to resolve the signal and reference beam electric field vectors into parallel components. Polarizing analysers 38 and 40 could have been placed ahead of beam combiner 32. However, by placing them after the beam combiner in a region where the signal and reference beams have already been combined, any wavefront errors introduced by the polarizing analysers will affect both beams equally, and the fringe pattern will be unaffected.

The types of components described above, and illustrated in FIG. 3, for the preferred embodiment of an SPPDI, along with the specific arrangement of components along the beam paths, provide an excellent degree of performance, and allow the objectives of this invention to be met. However, there are a wide variety of other types of components and/or arrangements of components which also meet the objectives, but which may not be as suitable as those described for the preferred embodiment. Some of these alternate approaches are interesting, and are worthy of discussion.

The overall optical throughput of the preferred embodiment of an SPPDI is limited to 5% or less. Most of this loss is associated with the non-polarizing, slightly absorptive coating used on the hypotenuse of double-pass beamsplitter cube 22. Much higher throughput could be achieved with the use of a polarization sensitive coating, in conjunction with a ¼ wave plate located within the output beam. However, only a few microwatts are required for producing highly visible fringes. Therefore, the losses associated with beamsplitter cube 22 are considered acceptable. The additional optical path length, complexity, and expense associated with the use of a polarizing beamsplitter and ¼ wave plate are therefore unnecessary.

The pinhole aperture described previously comprises a transparent hole in an otherwise nearly opaque coating. The incident beam approaches the pinhole aperture from a direction nominally perpendicular to the pinhole aperture. The reverse configuration consisting of a small reflective spot on an otherwise transparent substrate could be made to spatially filter the reference beam equally as well. In addition, the incident beam need not approach the pinhole aperture from a perpendicular direction. If the incident beam is not perpendicular, the pinhole aperture, whether reflective or transmissive, should have an elliptical shape consistent with the footprint of the beam. Many different optical configurations are possible with reflective or transmissive apertures used at either normal or off-normal incidence.

It is possible to place the pinhole aperture anywhere along the reference beam path, from a point immediately after the reference and signal beams are split, up to and including the point where the signal and reference beams are recombined. In particular, an interesting configuration is achieved if the incident signal beam is spatially filtered at the beam combining surface of the final beam combiner. The spatial filtering may be achieved by the use of either a small reflective spot on an otherwise transparent beam combining surface, or by a pinhole aperture in an otherwise highly reflective beam combining surface. In either case, two essentially identical signal beams traverse the two legs of the interferometer, and one beam is spatially filtered at the point where the beams are recombined.

With the configuration just described, the focal point of the signal beam must be kept far enough from the spatial filter to avoid being degraded by the action of the spatial filter. This is exactly the opposite situation which exists with the prior art PDI, where the signal beam must be kept sufficiently close to the spatial filter to provide sufficient energy for the creation of a suitably intense reference wavefront.

In the above configuration, only one tilt plate may be used for changing fringe spacing and/or orientation. The range for adjusting fringe spacing will therefore be only half of what may be achieved with two tilt plates. The remaining tilt plate may be used to fine tune the position of the incident signal beam on the pinhole aperture. This provides a convenient method for achieving final alignment between the interferometer and the optical system which is to be tested.

Other positions for the pinhole aperture are possible. However, the position for the pinhole aperture shown in FIG. 3 provides for a compact mechanical design, and minimizes the diameter of the signal and reference beams at their points of intersection with the various optical components.

A third (non-polarizing) tilt plate may be used for fine tuning the alignment of the SPPDI with the external optical system. With respect to the preferred embodiment of an SPPDI shown in FIG. 3, it would be necessary to open up some space between beamsplitters 22 and 25 in order to provide the required space for an additional tilt plate. In our judgment, the additional spherical aberration and astigmatism caused by the presence of another tilted glass plate in the beam path, along with the required increase in the packaging dimensions of the SPPDI, do not justify adding the third tilt plate.

As with other types of interferometers, the SPPDI may be designed to operate at virtually any wavelength, as long as the pinhole aperture has the proper diameter, and as long as the various components, such as beamsplitters, etc., have physical properties and optical tolerances which are suitable for interferometry at the operating wavelength. Although interferometry at virtually any wavelength is possible with the SPPDI, interferometry in the visible spectrum is greatly benefitted by the wide availability of optical components and coatings designed for use at 633 nanometers. This permits cost to be held down. Some low cost components designed for use at 633 nanometers were used in the prototype SPPDI. These components still work well at the 670 nanometer wavelength of the Toshiba laser diode incorporated in the prototype SPPDI. It is to be expected that visible laser diodes with operating wavelengths nearer to 633 nanometers will soon become available.

Cube beamsplitters are used in the preferred embodiment of an SPPDI, as illustrated in FIG. 3. For reasons already mentioned, this type of beamsplitter eliminates astigmatism and beam translation effects but requires that the internal focal ratio be limited to f/10 or higher in order to keep spherical aberration under control. This choice of focal ratio, in turn, sets the diameter of the pinhole aperture.

There may be other beamsplitter types which permit achieving a lower minimum focal ratio than can be achieved with cube beamsplitters. However, a lower focal ratio will also require a smaller pinhole aperture which will, in turn, result in an increased sensitivity to alignment conditions and ambient vibration. In addition, the size of beam deflecting components can become inordinately large when working with very low focal ratios. It may be possible to avoid the geometrical complications associated with low focal ratio beams by using non-standard beamsplitter types, such as diffraction gratings. However, problems arising from increased need for precise alignment and isolation from vibration still exist. These difficulties are avoided by simply working at higher focal ratios.

It may be desirable in some situations to generate a multiplicity of signal and/or reference beams internal to the SPPDI. This might be the case if it were desirable, for example, to simultaneously produce orthogonal fringe patterns. Ingenious ways might be devised to use diffraction gratings or other types of beam splitters to provide a multiplicity of beams. One or more of these beams might be spatially filtered in order to generate one or more reference beams.

As described earlier, polarizing tilt plates are placed in the signal and reference beams to permit adjustment of fringe contrast and intensity. This technique requires that the incident signal beam be linearly polarized, and also requires polarizing analysers to be placed just before or after the final beam combiner. However, tilt plates comprising variable neutral density filters might also be used in place of polarizing tilt plates, to adjust the relative intensities of the signal and reference beams, regardless of the polarization state of the beams. This approach would eliminate the need for polarizing analysers. While some optical simplification is achieved, the cost associated with variable neutral density filters is typically quite high. Since polarized light from the laser diode is already available, and due to the wide availability and low cost of polarizing filters, the slight increase in optical complexity arising from the use of polarizing analysers seems justified.

There are many ways in which this invention may be embodied, and other components which may be used. However, excellent results have been achieved with a prototype SPPDI fashioned after the form of the preferred embodiment, and incorporating the components as described.

In summary, it is the stated object of this invention to improve the performance of the prior art PDI by incorporating split beam paths, as in a Mach-Zehnder interferometer, thereby facilitating independent adjustment of fringe spacing, orientation, contrast, and intensity. The creation of split beam paths is associated in the preferred embodiment of an SPPDI by beamsplitting cubes, in the manner illustrated in FIG. 3, and as described in the preceding paragraphs. Fringe spacing, orientation, contrast, and intensity are adjusted by polarizing tilt plates whose roll, pitch, and yaw may be freely varied, and by polarizing analysers which are placed on the exit faces of the beam combiner, in the manner also described in the preceding paragraphs. The best features of the prior art PDI are retained in the SPPDI. These features include a low cost pinhole aperture for generating a reference wavefront, and the fact that the optical system to be tested is located external to the interferometer. The stated objective of achieving a compact, rugged design is achieved in the preferred embodiment, in the manner illustrated in FIG. 3. It is a further stated object of this invention to incorporate a compact, solid state laser diode source and a beamsplitter such that double pass interferometry may be performed, while keeping the overall package size small and rugged. Again, FIG. 3 illustrates how this objective is met in the preferred embodiment.

The foregoing description of the preferred embodiment of a split-path point-diffraction interferometer has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A split-path point-diffraction interferometer (SPPDI) which comprises interference fringes whose brightness, contrast, spacing, and orientation may be independently adjusted, comprising (a) a beamsplitter for dividing an incident beam into a reference beam and a signal beam; wherein said signal beam exits said beamsplitter substantially preserving the wavefront characteristics of said incident beam; and (b) a spatial filter, said spatial filter being placed in said reference beam path, said reference beam being brought to focus on said spatial filter, said spatial filter having a diameter less than the diameter of the Airy disc corresponding to the focal ratio and wavelength of said focused reference beam, wherein said focused reference beam is spatially filtered and converted by diffraction to a substantially diffraction-limited expanding reference beam; and (c) variable filters for adjusting beam intensity, wherein one of said variable filters is located in the path of said reference beam and another of said filters being located in the path of said signal beam, one of said variable filters being used to adjust the intensity of a respective one of said beams so as to obtain adjustment of interference fringe brightness and interference fringe contrast; and (d) beam steering means for adjusting beam position and orientation, one of said beam steering means being located in the path of said reference beam and another said beam steering means being located in the path of said signal beam, said beam steering means being used to adjust the relative position and orientation of a respective one of said beams so as to obtain adjustment of interference fringe spacing and orientation.

2. The split-path point-diffraction interferometer of claim 1 wherein said beamsplitter is comprised of a cube beamsplitter.

3. The split-path point-diffraction interferometer of claim 1 wherein said beamsplitter is comprised of a substantially non-polarizing or substantially polarization-insensitive beamsplitting property, wherein division of said incident beam into said reference and signal beams is substantially independent of the polarization state of said incident beam.

4. The split-path point-diffraction interferometer of claim 1 wherein said spatial filter is comprised of a substantially transparent pinhole aperture located in a nearly opaque coating deposited on a substantially transmissive optical substrate, said pinhole aperture being located in a system of substantially transparent fiducial marks suitable for use in guiding placement of the focal point of said reference beam on said pinhole aperture, said coating having residual optical transmittance, said residual transmittance being large enough to permit observation of the position of said reference beam, and said residual transmittance being small enough to prevent interference of the residual light transmitted through said coating with light transmitted by said pinhole aperture.

5. The split-path point-diffraction interferometer of claim 4 further including substantially transmissive optical path length compensation plate, said compensation plate being inserted in said signal beam path following said beamsplitting means, said compensation plate having a thickness substantially equal to the thickness of the substrate supporting said spatial filter.

6. The split-path point-diffraction interferometer of claim 1, further including a beam combiner for combining said signal and reference beams to produce a combined output beam being comprised of a signal beam portion and a reference beam portion.

7. The split-path point diffraction interferometer of claim 6 wherein said beam combiner is comprised of a cube beam combiner.

8. The split-path point diffraction interferometer of claim 6 wherein said beam combiner is comprised of a substantially non-polarizing or substantially polarization-insensitive beam combining property, wherein combination of said signal beam with said reference beam is substantially independent of the polarization state of said signal beam and said reference beam, and wherein the polarization state of said signal beam and the polarization state of said reference beam remain substantially unmodified by said beam combining property of said beam combiner.

9. The split-path point-diffraction interferometer of claim 8 further including a multiplicity of substantially linearly polarizing analysers, said analysers being placed immediately in front of or immediately following said beam combiner, said analysers having a rotational orientation suitable for causing the electric field vectors of said combined beams to be resolved into parallel components, thereby enhancing contrast of interference fringes.

10. The split-path point-diffraction interferometer of claim 6 wherein said beam steering means are comprised of a coarse beam steering means and a fine beam steering means, one of said coarse beam steering means being located in a respective one of said beams produced by said beamsplitter, one of said fine beam steering means being located in a respective one of said beams produced by said beamsplitter, one of said coarse beam steering means being used to direct said signal beam toward said beam combiner, one of said coarse beam steering means being used to direct said reference beam toward said beam combiner, said coarse beam steering means and said beam combiner acting cooperatively to achieve a condition of initial substantial coaxial alignment of said signal beam portion with said reference beam portion within said combined output beam produced by said beam combiner to provide for initial wide interference fringe spacing within said combined output beam, said coarse beam steering means being mechanically mounted in a manner such that said condition of initial substantial coaxial alignment may be locked in place and retained indefinitely, said fine beam steering means being used to modify said condition of initial coaxial alignment to provide for subsequent modifications to interference fringe spacing and interference fringe orientation within said combined output beam produced by said beam combiner.

11. The split-path point-diffraction interferometer of claim 10 wherein said fine beam steering means is comprised of an optical tilt plate, said tilt plate being comprised of transmissive, flat, optical grade material, one of said tilt plates transmitting a respective one of said beams produced by said beamsplitter, said tilt plate being mechanically mounted to permit tilting of said tilt plate about any axis nominally perpendicular to the direction of transmission of said transmitted beam, said tilt causing beam translation of said transmitted beam by an amount in relation to and as determined by the thickness of said tilt plate and by the refractive index of said tilt plate and by the change in orientation of said tilt plate, said beam translation being achieved while substantially preserving the spatial orientation of said transmitted beam, wherein said beam translation produces changes in interference fringe spacing and interference fringe orientation within said combined output beam produced by said beam combiner.

12. The split-path point-diffraction interferometer of claim 11, wherein said tilt plate is further comprised of said variable filter, said variable filter comprising rotational variability about an axis nominally parallel to said direction of transmission of said transmitted beam, said mechanical mount further permitting rotational motion of said tilt plate about an axis nominally parallel to said direction of said transmission of said transmitted beam, said rotational motion of said tilt plate inducing changes in intensity of said transmitted beam in relation to and as determined by the rotational orientation of said tilt plate, wherein changes in interference fringe contrast and interference fringe intensity are produced within said combined output beam produced by said beam combiner.

13. The split-path point-diffraction interferometer of claim 12 wherein said beams produced by said beamsplitter are substantially linearly polarized and wherein said tilt plate is comprised of substantially flat, optical grade linear polarizing material, wherein said changes in intensity of said transmitted beam are achieved by polarization analysis of said transmitted beam as determined by the rotational orientation of said tilt plate and by the direction of the electric field vector within said linearly polarized beam.

14. The split-path point-diffraction interferometer of claim 10 wherein said coarse beam steering means is comprised of a substantially flat, first surface mirror.

15. A double-pass split-path point-diffraction interferometer (SPPDI) comprising
   (a) the split-path point-diffraction interferometer of claim 1; and
   (b) a source of substantially linearly polarized light, said linearly polarized light source being substantially spatially unresolved by the external optical system to be tested; and (c) a double-pass beamsplitter, said double-pass beamsplitter being optically aligned with said linearly polarized light source and with said SPPDI and with said external optical system, said double-pass beamsplitter being used to produce a linearly polarized output beam by directing a portion of said linearly polarized light from said linearly polarized light source toward said external optical system, said double-pass beamsplitter allowing a portion of said incident signal beam returned by said external optical system to pass into said SPPDI, said double-pass beamsplitter being located such that said light source and said pinhole aperture comprising said spatial filter are optically equidistant from said beamsplitter, said double-pass beamsplitter being aligned such that said light source and said pinhole aperture appear to be superimposed when viewed through said double-pass beamsplitter.

16. The double-pass SPPDI of claim 15 wherein said source of substantially linearly polarized light is comprised of a laser.

17. The split-path point-diffraction interferometer of claim 1 wherein said spatial filter is comprised of a substantially reflective spot located in a substantially transmissive substrate.

18. The split-path point-diffraction interferometer of claim 17 wherein said spatial filter has an elliptical shape consistent with operation at non-normal incidence.

19. A split-path point-diffraction interferometer (SPPDI), comprising:

(a) beamsplitting means to divide a substantially linearly polarized incident converging beam into converging reference and signal beams, said beamsplitting means directing said converging beams into respective beam paths, one of said beam paths being designated as a reference beam path, one of said beam paths being designated as a signal beam path within which said incident beam travels without being substantially modified, said signal beam substantially preserving the wavefront characteristics of said incident beam, said beamsplitting means placed in said linearly polarized incident converging beam at a position prior to the focus of said linearly polarized incident converting beam; and (b) a spatial filter, said spatial filter being placed in said reference beam path at the focal point of said reference beam, said spatial filter being comprised of a pinhole aperture having a diameter less than the diameter of the Airy disc corresponding to the focal ratio and wavelength of said reference beam, said spatial filter being used to spatially filter said reference beam to generate a substantially diffraction-limited expanding reference beam; and (c) optical tilt plates, said tilt plates comprising substantially flat, optical grade linear polarizing material of known thickness and refractive index, one of said tilt plates placed in said signal beam path thereby becoming a signal beam tilt plate, one of said tilt plates placed in said reference beam path thereby becoming a reference beam tilt plate, said reference beam tilt plate placed at a position in said reference beam path following said spatial filtering means, said tilt plates being mechanically mounted in a manner to permit tilt and rotational adjustments of said tilt plates, said tilt adjustments comprising rotations about any axis nominally perpendicular to the direction of beam transmission through said tilt plate, said tilt adjustments of one of said tilt plates inducing beam translations of a respective one of said beams in relation to and as determined by the thickness of said tilt plate and by the refractive index of said tilt plate and by the change in tilt of said tilt plate to produce changes in interference fringe spacing and interference fringe orientation, said rotational adjustments comprising rotations about an axis nominally parallel to the direction of beam transmission through said tilt plate, said rotational adjustments of one of said tilt plates inducing changes in beam intensity of a respective one of said beams in relation to and as determined by the rotational orientation of said tilt plate and by the orientation of the electric field vector of said beam to provide for adjustment in interference fringe contrast and interference fringe intensity; and (d) beam combining means to facilitate combination of said signal beam with said spatially filtered reference beam, said beam combiner producing a combined output beam, said combined output beam being comprised of a signal beam portion and a reference beam portion, said signal beam portion and said reference beam portion of said combined output beam being initially substantially coaxially aligned, said initial coaxial alignment of said signal beam and reference beam portions being subsequently modified by varying the tilt of said tilt plates to modify interference fringe spacing and interference fringe orientation within said combined output beam; and (e) beam alignment means comprising beam turning mirrors placed in said signal beam path and in said reference beam path, to provide for initial adjustment of the position and orientation of said signal and reference beam portions within said combined output beam to provide for an initial condition of large interference fringe spacing within said combined output beam; and (f) linear polarizing analyzer means placed in said combined output beam, said analyzer means being used to resolve the electric field vectors of said signal beam and reference beam portions within said combined output being into parallel components.

20. A split-path point-diffraction interferometer (SSPDI) in accordance with claim 19, wherein said beam combining means produces a pair of combined output beams, each of said pair of output beams comprising a signal beam portion and a reference beam portion; and wherein said analyzer means comprises first and second analyzers, one of said analyzers being placed in a respective one of said pair of combined output beams.

* * * * *